United States Patent Office 3,371,103
Patented Feb. 27, 1968

3,371,103
6,17-DISUBSTITUTED 5(10)-ANDROSTENES
John S. Tadanier, Chicago, Ill., assignor to Abbott Laboratories, Chicago, Ill., a corporation of Illinois
No Drawing. Filed Dec. 13, 1965, Ser. No. 513,567
7 Claims. (Cl. 260—397.4)

ABSTRACT OF THE DISCLOSURE

A process for making 6,17-disubstituted 5(10)-androstenes is described; the new compounds are useful antiandrogens which inhibit or reduce prostate growth.

---

The present invention is directed to 3,6,17-trisubstituted 5(10)-estrenes, more particularly it is directed to compounds of the formula

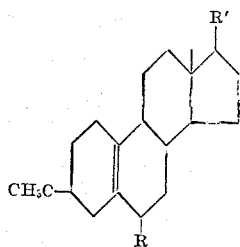

wherein R is methyl or chloromethyl and wherein R' is oxygen, hydroxy or an acyloxy group of the formula R"COO wherein R" is loweralkyl (1–7 carbon atoms), phenyl, benzyl or nitrophenyl. These new compounds show pronounced growth inhibiting effects on warmblooded animals and thus are useful in the classical sense as anti-androgens. These compounds are preferably used in a dosage of between 0.1–2.5 mg./kg./day in warmblooded animals and can be administered intramuscularly, subcutaneously or orally.

The compounds of the present invention are made by treating 3β-methoxy-7β-hydroxy-B-homoestr - 5(10) - en-17-one (described by Tadanier and Cole in Tetrahedron Letters, vol. 21, pps. 1345–52 of 1964) with thionyl chloride in ether which leads to a mixture of 3β-methoxy-7β-chloro-B-homoestr-5(10)-en-17-one and 3β-methoxy-6β-chloromethylestr-5(10)-en-17-one. Upon treatment of this mixture with an alkali metal chloride or a tetralower-alkyl ammonium chloride in an ether or alcohol boiling between 60 and 120° C. for one to several hours at a temperature between 60° and the boiling point of said solvent, the above-named 7β-chloro-B-homoestr-5(10)-ene converts to the above-named 6β-chloromethylestr-5(10)-ene. The latter compound, upon treatment with lithium aluminum hydride in diethylene glycol dimethyl ether or its equivalents, is easily converted to 3β-methoxy-6β-methylestr-5(10)-en-17β-ol which can be esterified in the 17-position with an acid of the formula R"COOH wherein R" is loweralkyl, phenyl, benzyl or nitrophenyl.

In order to illustrate the preparation of the new compounds, reference is made to the following examples which are not meant to limit the invention.

*Example 1.—3β-methoxy-6β-chloromethylestr-5(10)-en-17-one*

A suspension of 1.3 g. of 3β-methoxy-7β-hydroxy-B-homoestr-5(10)-en-17-one in 20 ml. of ether is cooled in an ice bath and 0.5 ml. of thionyl chloride is added while stirring. Stirring is continued for one hour, the first 10 minutes still under ice cooling, the remaining time at room temperature. A clear solution results from which the ether and excess thionyl chloride is evaporated under reduced pressure at room temperature leaving 1.07 g. of an orange oil which is dried overnight at room temperature under high vacuum. The product gives an immediate precipitate with 2% methanolic silver nitrate solution. The area of angular methyl peaks at 54 and 58 cps. in the nuclear magnetic resonance spectrum reveals that the product is a mixture of one part of 3β-methoxy-6β-chloromethylestr-5(10)-en-17-one and four parts of 3β-methoxy-7β-chloro-B-homoestr-5(10)-en-17-one.

The mixture (975 mg.) of the two isomeric compounds is heated under reflux for 5 hrs. with a solution prepared from 1.18 g. of lithium chloride and 58 ml. of isopropanol. The solvent is subsequently evaporated and the residue is shaken with a mixture of 150 ml. of ether and 150 ml. of water. The aqueous phase is separated and extracted with 150 ml. of ether. The ether solutions are washed in series with 100 ml. of 5% aqueous sodium bicarbonate solution and three 100 ml. portions of water before being combined and being dried over anhydrous magnesium sulphate. Evaporation of ether leaves 962 mg. of an oil which shows only a single angular methyl peak at 54 cps. in the NMR spectrum.

The product is chromatographed on 90 g. of activity III alumina. Elution with benzene/petroleum ether (boiling at 66° C.) 1:2 gives 691 mg. of 3β-methoxy-6β-chloromethylestr-5(10)-en-17-one melting at 102–106° C. with $[\alpha]_D^{26} + 100°$. This product gives no precipitate upon treatment with 2% methanolic silver nitrate solution at room temperature. Its analysis is in good agreement with the values calculated for the empirical formula $C_{20}H_{29}O_2Cl$.

*Example 2.—3β-methoxy-6β-methylestr-5(10)-en-17β-ol*

3β-methoxy-6β-chloromethylestr - 5(10) - en - 17 - one, 220 mg., is heated under reflux and stirring for 5 hours in a nitrogen atmosphere with a slurry prepared from 3.5 g. of lithium aluminum hydride and 50 ml. of diethylene glycol dimethyl ether. The reaction mixture is subsequently stirred overnight at room temperature after which time the excess lithium aluminum hydride is decomposed by the careful addition of water. The mixture is then acidified by adding 400 ml. of 6 N hydrochloric acid, the first 100 ml. being added with stirring. The resulting mixture is extracted with two 400 ml.-portions of ether. The ether solutions are washed in series with water, 5% aqueous sodium bicarbonate solution and three 100 ml.-portions of water. The ether extracts are then combined, dried over anhydrous magnesium sulfate, and the ether is evaporated to leave 200 ml. of an oil.

175 mg. of this oil is chromatographed on 20 g. of alumina. Elution with ether/benzene 1:10 yields 135 mg. of 3β-methoxy-6β-methylestr-5(10)-en-17β-ol as a colorless oil which is characterized by its infrared, ultra violet and NMR spectra and by conversion to the crystalline p-nitrobenzoate.

*Example 3.—3β-methoxy-6β-methyl-17β-p-nitrobenzoyloxyestr-5(10)-ene*

To a solution of 85 mg. of the product described in Example 2 in 1.0 ml. of pyridine is added 120 mg. of p-nitrobenzoyl chloride. The reaction mixture is allowed to stand at room temperature for 3.5 hours and then worked up by ether extraction to yield 123 mg. of 3β-methoxy-6β-methyl-17β-p-nitrobenzoyloxyestr-5(10) - ene melting at 159–64° C. and showing $[\alpha]_D^{26} + 67$. The analytical values are in good agreement with those calculated for the compound of empirical formula $C_{27}H_{35}O_5N$.

When in the above procedure, p-nitrobenzoyl chloride is replaced by benzoyl chloride or phenylacetic acid chloride, the corresponding 17β-benzoyloxy or phenylacetoxy derivatives are obtained.

*Example 4.—3β-methoxy-6β-chloromethylestr-5(10)-en-17β-ol*

To a solution of 200 mg. of 3β-methoxy-6β-chloromethylestr-5(10)-en-17-one in 25 ml. of methanol is added 8 ml. of a solution prepared from 1.5 g. of sodium borohydride and 20 ml. of water. The resulting solution is stirred at room temperature for 20 minutes and then poured into 250 ml. of water. The aqueous mixture is extracted with two 200 ml.-portions of ether and the ether solutions are washed in series with four 100 ml.-portions of water. The ether solutions are combined, dried over anhydrous magnesium sulfate and the ether is then evaporated to leave 3β-methoxy-6β-chloromethylestr-5(10)-en-17β-ol as an oil. The analysis is in good agreement with the values calculated for the empirical formula $C_{20}H_{31}O_2Cl$. The compound is characterized by forming the 17β-p-nitrobenzoate ester which is isolated as a crystalline material and is characterized by its NMR spectrum.

*Example 5.—3β-methoxy-6β-chloromethyl-17β-acetoxyestr-5(10)-ene*

To a solution of 120 mg. of 3β-methoxy-6β-chloromethyl-17β-hydroxyestr-5(10)-en-17β-ol in 4 ml. of pyridine is added 2 ml. of acetic anhydride. The resulting solution is allowed to stand overnight at room temperature and is then shaken with a mixture of 80 ml. of ether and 50 ml. of water. The aqueous phase is separated and extracted with 80 ml. of ether. The ether solutions are washed in series with 50 ml. of water, 50 ml. of 5% aqueous sodium bicarbonate and three 50 ml.-portions of water. The ether solutions are then combined, dried over anhydrous magnesium sulfate, and the ether is evaporated to leave 3β-methoxy-6β-chloromethyl-17β-acetoxyestr-5(10)-ene. The analytical values are in good agreement with those calculated for empirical formula $C_{22}H_{33}O_3Cl$.

By replacing the above acetic anhydride with propionic anhydride or caproic acid chloride, the corresponding 17β-propionoxy- or 17β-caproyloxy steroids are obtained.

*Example 6.—3β-methoxy-6β-methyl-17β-acetoxyestr-5(10)-ene*

To a solution of 150 mg. of 3β-methoxy-6β-methylestr-5(10)-en-17β-ol in 4 ml. of pyridine is added 2 ml. of acetic anhydride. The resulting solution is allowed to stand overnight at room temperature and the product is isolated as described in Example 3 to give 3β-methoxy-6β-methyl-17β-acetoxyestr-5(10)-ene of which the analytical values are in good agreement with those calculated for the empirical formula $C_{22}H_{38}O_3$.

By replacing the acetic anhydride used above with butyric anhydride, the above procedure produces 3β-methoxy-6β-methyl-17β-butyroxyestr-5(10)-ene.

*Example 7.—3β-Methoxy-6β-methylestr-5(10)-en-17-one*

To a solution of 150 mg. of 3β-methoxy-6β-methyl-estr-5(10)-en-17β-ol in 1.2 ml. of pyridine is added 2.5 ml. of a complex prepared from 470 mg. of chromic anhydride and 4.3 ml. of pyridine. After allowing the mixture to stand at room temperature for 20 hours, it is diluted to 40 ml. with ether, and filtered through a mat of diatomaceous earth. The mat is subsequently washed with two 20 ml.-portions of ether and the ether solutions are added to the original ether filtrate. The combined ether solutions are washed with 80 ml. of water and the aqueous phase is separated and once more extracted with 80 ml. of ether. The ether solutions are washed in series with three 100 ml.-portions of water, combined, and dried over anhydrous magnesium sulfate. Evaporation of the solvent leaves 3β-methoxy-6β-methylestr-5(10)-en-17-one, the analysis of which shows good agreement with the values calculated for empirical formula $C_{20}H_{30}O_2$.

Others may practice the invention in any of the numerous ways which will be suggested to one skilled in the art by the present disclosure. All such practice of the invention is considered to be a part hereof provided it falls within the scope of the appended claims.

I claim:

1. The process of treating 3β-methoxy-7β-hydroxy-B-homoestr-5(10)-en-17-one with at least one molar equivalent of thionyl chloride in ether at 0–25° C. for 0.5–4 hrs., isolating the product mixture, heating the product mixture for 1–12 hrs. with at least one molar equivalent of a compound of the formula MCl wherein M is an alkali metal or tetraloweralkylammonium in a liquid of a boiling point between 60 and 120° C. and having a formula of ROR' or ROH wherein R and R' represent saturated alkyl groups, to a temperature between 60° C. and the boiling point of said liquid, evaporating said liquid, extracting the residue with water and an inert water-immiscible organic solvent for the reaction product, and recovering the corresponding 3β-methoxy-6β-chloromethyl-estr-5(10)-en-17-one from said organic solvent.

2. The process of claim 1 wherein said liquid formula ROH is isopropanol.

3. The process of claim 1 wherein said compound of the formula MCl is lithium chloride.

4. A compound of the formula

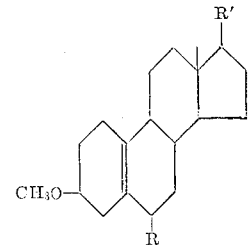

wherein R is methyl or chloromethyl and R' is oxygen,

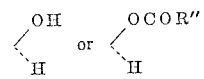

wherein R" is loweralkyl, phenyl, benzyl or nitrophenyl.

5. The compound of claim 4 wherein R is chloromethyl and R' is oxygen.

6. The compound of claim 4 wherein R is methyl and wherein R' is hydroxy.

7. The compound of claim 4 wherein R is methyl or chloromethyl and wherein R' is acetoxy.

References Cited

UNITED STATES PATENTS 3,068,249   12–1962   Colten et al. _____ 260–397.5

LEWIS GOTTS, *Primary Examiner.*

T. MESHBESHER, *Assistant Examiner.*